Feb. 23, 1960 N. L. PARKS 2,925,930
DEMOUNTABLE CARGO BOX FOR VEHICLES
Filed May 14, 1958 5 Sheets-Sheet 1
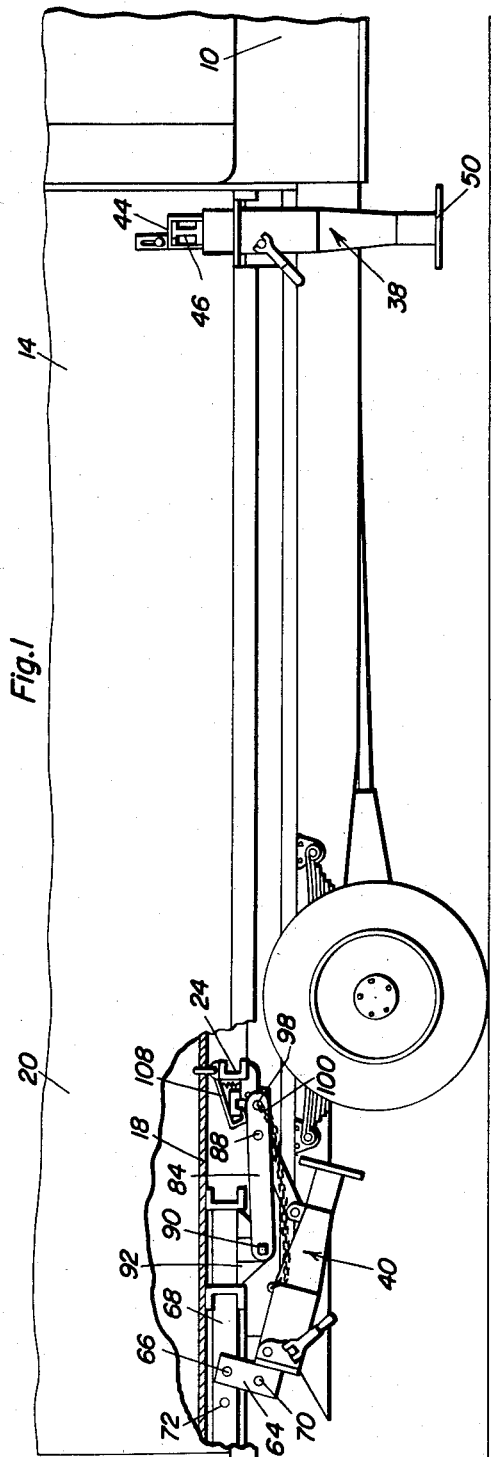
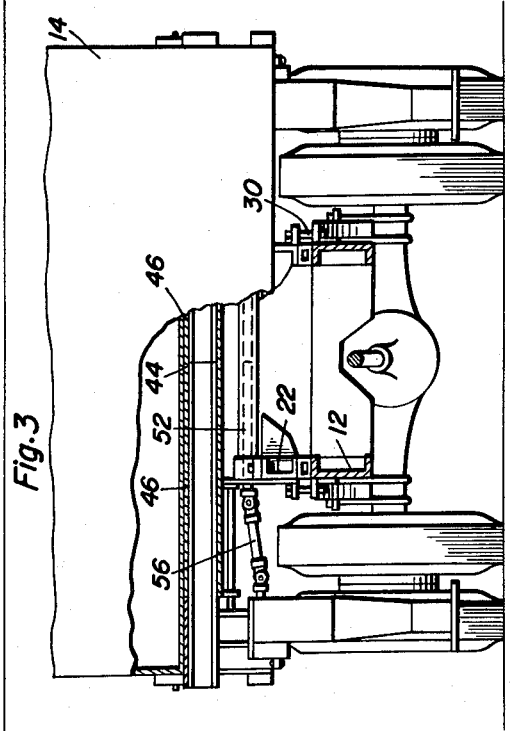
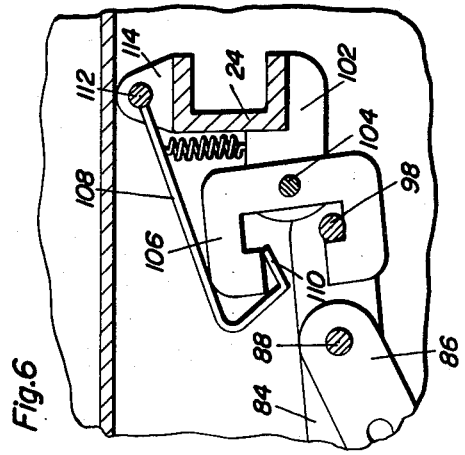
Noble L. Parks
INVENTOR.

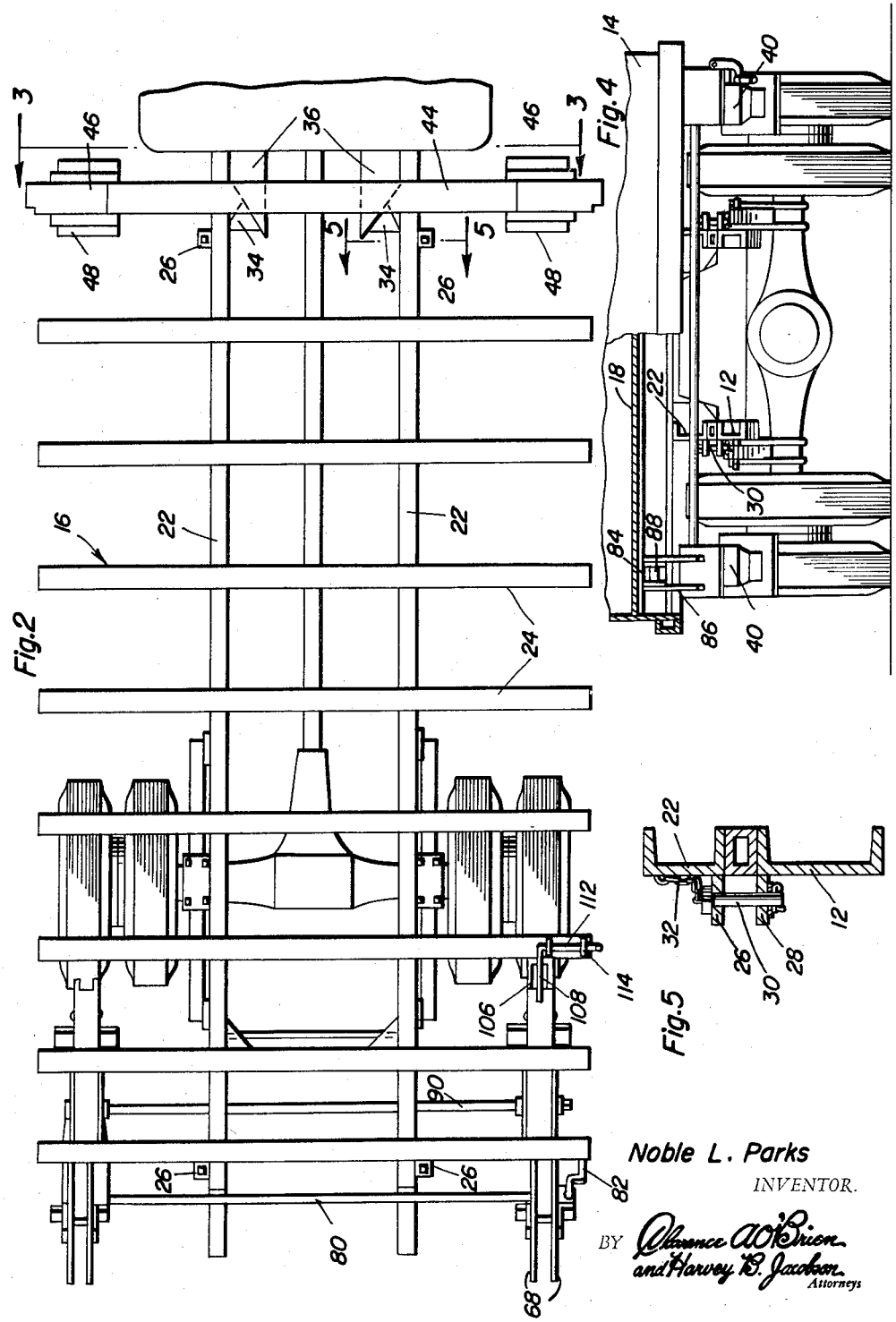

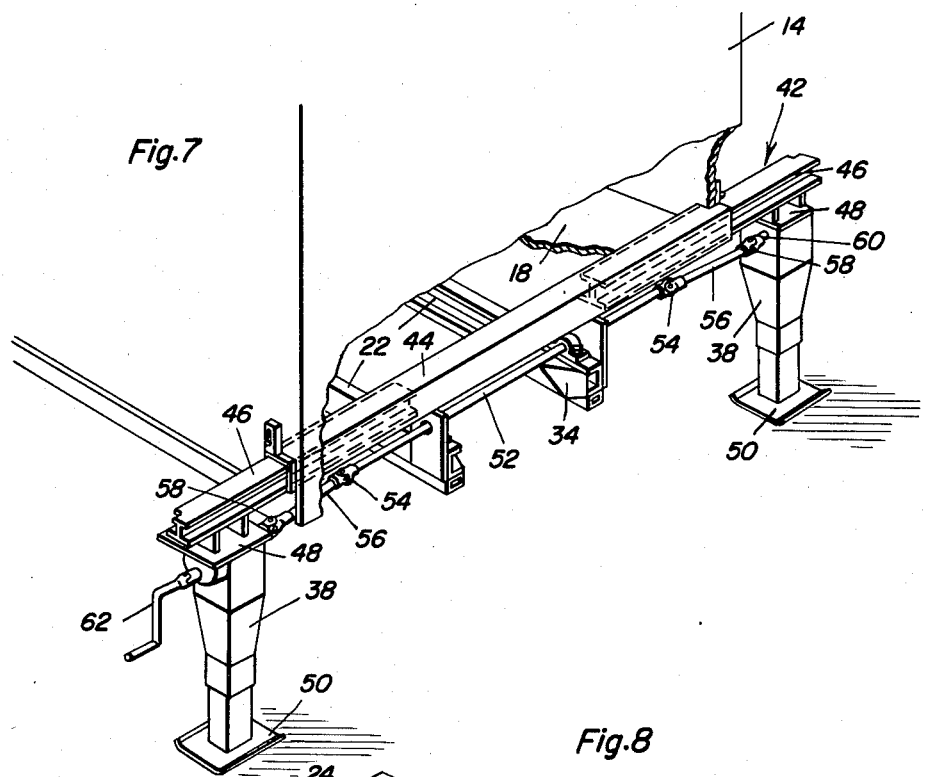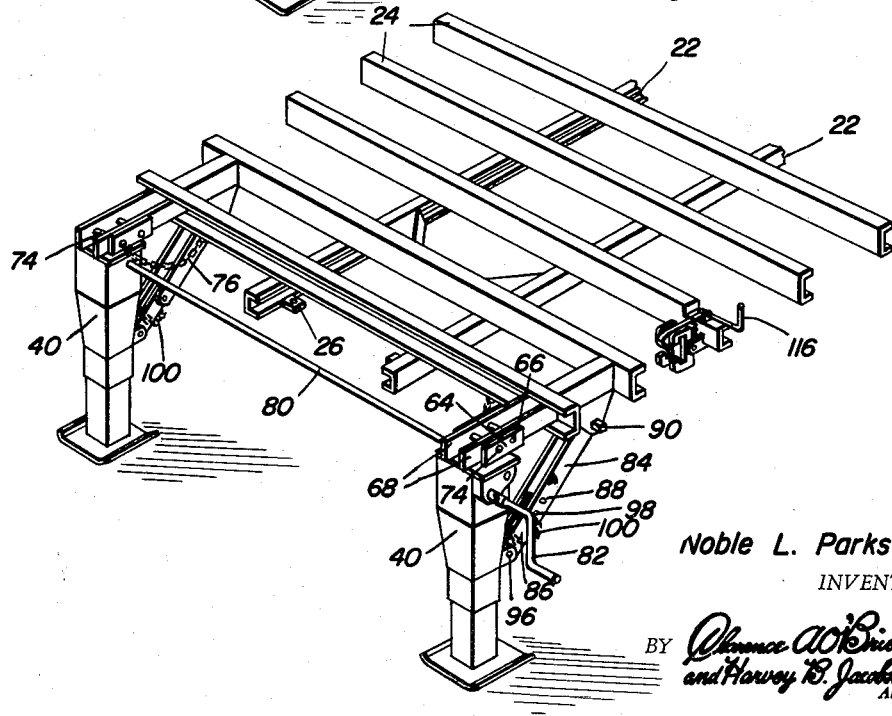

Feb. 23, 1960            N. L. PARKS            2,925,930
DEMOUNTABLE CARGO BOX FOR VEHICLES
Filed May 14, 1958            5 Sheets-Sheet 4
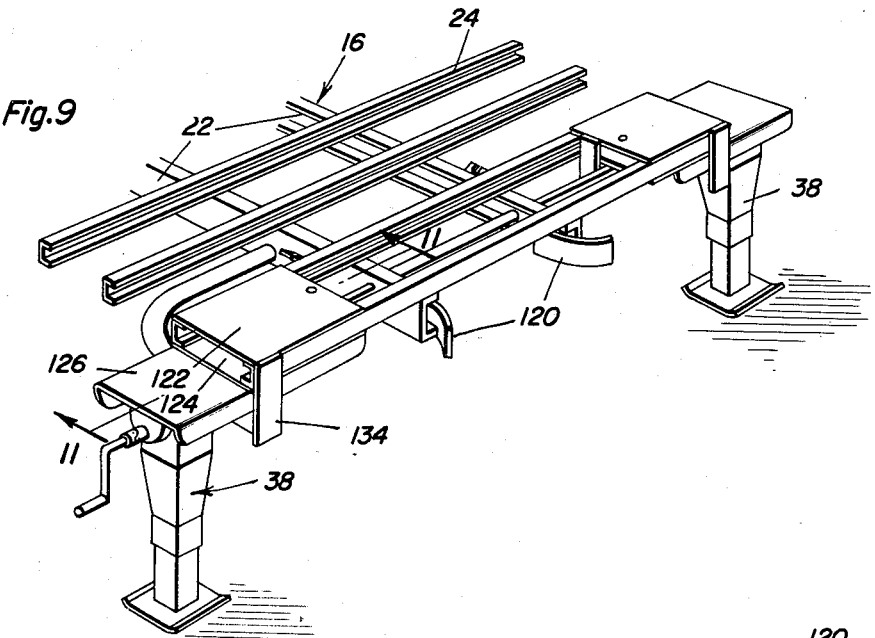
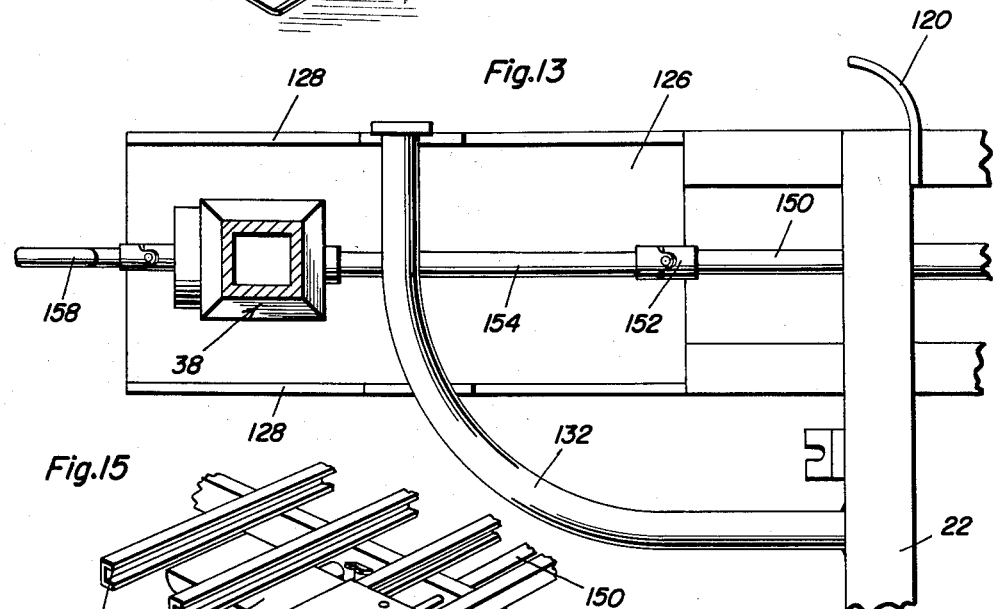
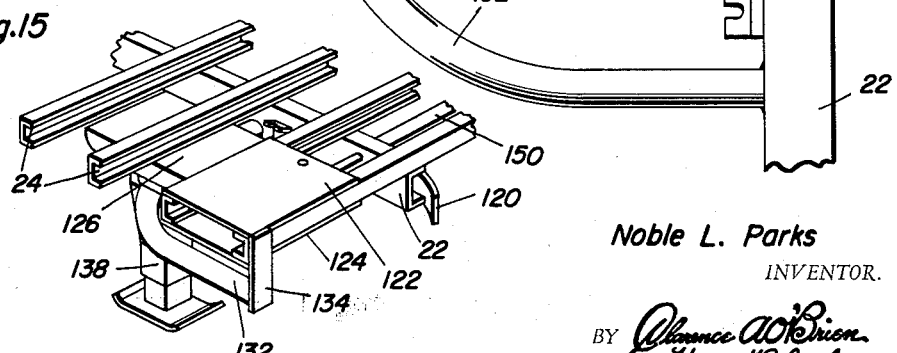
Noble L. Parks
INVENTOR.

Feb. 23, 1960 N. L. PARKS 2,925,930
DEMOUNTABLE CARGO BOX FOR VEHICLES
Filed May 14, 1958 5 Sheets-Sheet 5
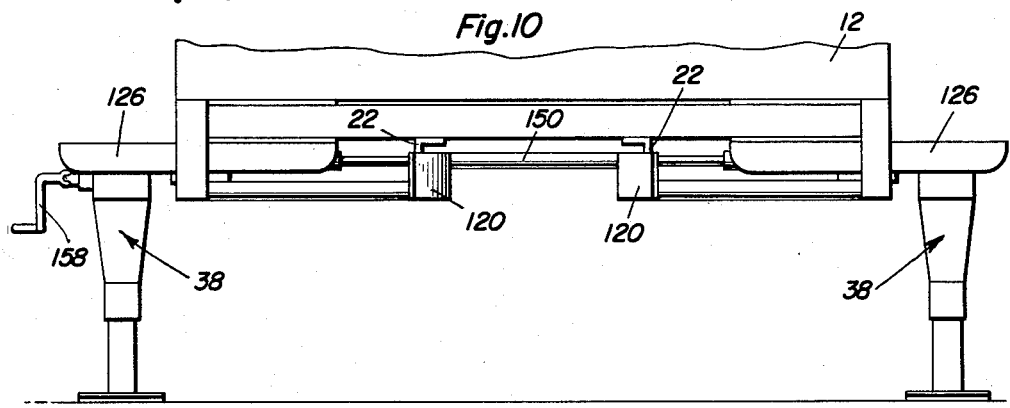
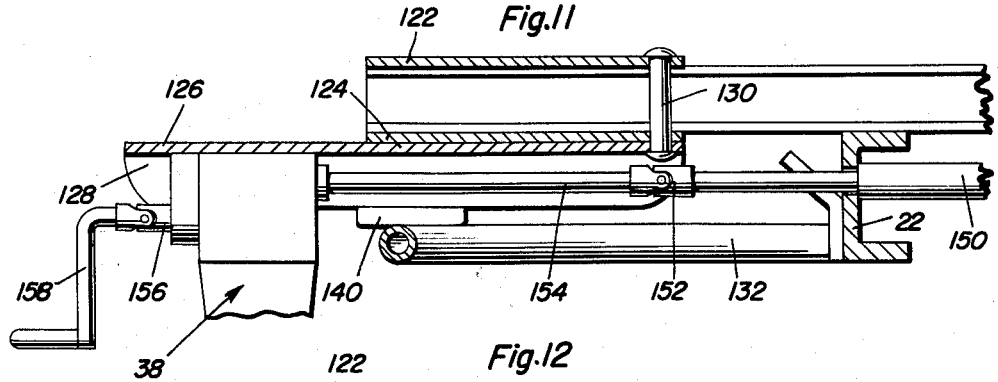
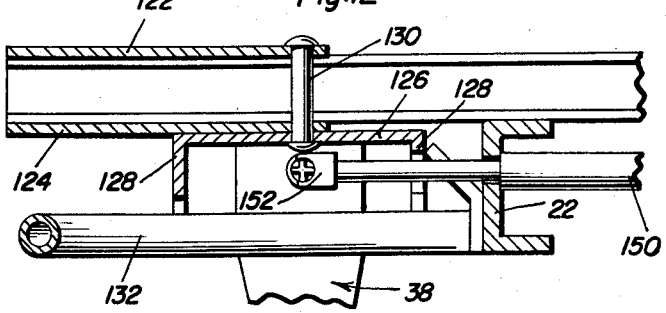
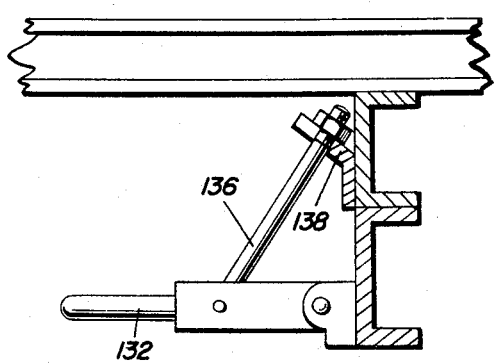
Noble L. Parks
INVENTOR.

United States Patent Office 2,925,930
Patented Feb. 23, 1960

2,925,930

DEMOUNTABLE CARGO BOX FOR VEHICLES

Noble L. Parks, Meridian, Miss., assignor of one-third to R. A. Goodling, and one-third to W. L. Runge, both of Meridian, Miss.

Application May 14, 1958, Serial No. 735,320

9 Claims. (Cl. 214—515)

This invention comprises a novel and useful demountable cargo box for vehicles and more particularly has reference to a removable truck body together with means for facilitating the mounting of the truck body upon the chassis of a vehicle and its removal therefrom whereby to greatly facilitate and render more economical the use of a single truck with a plurality of interchangeable removable bodies or cargo boxes.

The primary object of this invention is to provide a demountable cargo box or truck body for vehicles having improved means to lock the removable cargo box to the chassis of the vehicle and release the same therefrom.

A further object of the invention is to provide an apparatus in accordance with the foregoing object wherein the removable cargo box shall have an advantageously constructed supporting rig assembly readily extensible for supporting the cargo box upon the ground, and retractible when the cargo box is to be mounted upon the chassis of a vehicle.

Yet another object of the invention is to provide an apparatus as set forth in the foregoing objects wherein the demountable cargo box shall have guide means to facilitate the engagement of cooperating elements of the truck chassis therewith whereby the truck may readily be engaged with and pick up a cargo box in readiness for transportation by the truck chassis.

A further important object of the invention is to provide a demountable cargo box in compliance with the preceding objects wherein different forms of support leg assemblies by which the cargo box is to be supported when the same is dismounted from the truck vehicle, and which shall be effective in their operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In the accompanying drawings, Figures 1–8 relate to a first embodiment of a demountable cargo box in accordance with this invention, while Figures 9–15 illustrate a modified construction thereof.

Figure 1 is a side elevational view of a portion of a truck showing the demountable cargo box in accordance with a first embodiment of this invention mounted thereon for transportation thereby, parts being broken away and shown in vertical section to illustrate one of the supporting legs of the cargo box and the latch means for releasably locking the cargo box to the truck chassis;

Figure 2 is a top plan view of the truck chassis in accordance with Figure 1, the cargo box being removed therefrom;

Figure 3 is a vertical transverse sectional view of the embodiment of Figure 1, being taken substantially upon the plane indicated by the section line 3—3 of Figure 2 and showing some of the mechanism for lowering and retracting the front supporting leg assembly of the cargo box;

Figure 4 is a fragmentary rear elevational view of the embodiment of Figure 1, parts being broken away and shown in vertical section;

Figure 5 is a detail view taken substantially upon a plane indicated by the vertical transverse section line 5—5 of Figure 2 and showing one of the means for locking the demountable cargo box upon the truck chassis;

Figure 6 is a detail view upon an enlarged scale partly in elevation and partly in vertical section of the latch mechanism for releasably locking the rear leg assembly to the cargo box base;

Figures 7 and 8 are fragmentary perspective views of the supporting framework of the cargo box and the retractible front and rear leg assemblies thereof;

Figure 9 is a fragmentary perspective view of a portion of the frame of the base of a second embodiment of a cargo box having a modified front supporting leg assembly;

Figure 10 is a fragmentary end elevational view of the demountable cargo box of this embodiment, the leg assembly being shown in supporting position;

Figure 11 is a detail view taken substantially upon the plane indicated by the section line 11—11 of Figure 9 and showing certain details of the leg operating mechanism of the cargo box of this embodiment;

Figure 12 is a view similar to Figure 11 but showing the position of the swingable leg when the latter has been rotated 90° about its vertical axis;

Figure 13 is a fragmentary horizontal sectional view showing further details of the retractible supporting leg assembly of this embodiment;

Figure 14 is a detail view in vertical section of a portion of the track supporting means of the movable leg assembly of this embodiment; and Figure 15 is a fragmentary perspective view of the front supporting leg assembly in its retracted and folded position.

*Embodiment of Figures 1–8*

Reference is now made first to Figures 1–8 which disclose the general structural and operational details of both embodiments of the invention, together with the specific and structural details and operation of the front leg assembly of the first embodiment. In the accompanying drawings the numeral 10 designates generally the chassis of a vehicle, the chassis being provided with the usual frame side members 12, see Figure 5, upon which the demountable cargo box designated generally by the numeral 14 is removably carried. The demountable cargo box assembly consists of a supporting framework or base designated generally by the numeral 16 and which is shown best in Figure 2, the cargo box including a bottom wall 18 which rests upon and is secured to the base in any desired manner, together with side and end walls 20 of any conventional character which make up the demountable cargo box. The base 16 comprises a pair of side frame members 22 upon which are secured the usual transverse stringers 24 upon which the bottom wall 18 is mounted. As shown in the detail view of Figure 5, the side frame members 22 and 12 of the base and vehicle chassis respectively may consist of the usual channel members, and in order to detachably secure the base of the demountable cargo box upon the chassis of the vehicle 10, laterally projecting apertured lugs 26 and 28 respectively are welded or otherwise rigidly secured to the sides of these frame members and receive therethrough a locking pin 30 which may be secured to the base frame member 22 as by a chain or the like 34. Thus, when the base is properly positioned upon the chassis, the locking pins 30 may be engaged in the two lugs 26 and 28 and securely lock the base and therefore the cargo box to the chassis against shifting movement.

At its forward end, the base is provided with guide means which cooperate with complementary means on the vehicle chassis to properly position the base over the chassis when the truck is backed under the body as the latter rests upon its supporting legs. For this purpose, the side frame members 22 of the base at their forward ends are provided upon their inner surfaces with a pair of guides 34, see in particular Figures 2 and 7, which guides have their adjacent surfaces rearwardly inwardly inclined. Carried by the chassis of the vehicle are a pair of complementary guide members 36 having complementary rearwardly convergent guide surfaces adapted to engage those with the members 34 when the tractor vehicle is backed under the elevated base. The cooperation of these guide surfaces serves to align the side frame members 22 of the base 16 vertically above the corresponding chassis side frame members 12 so that upon proper longitudinal adjustment of these frame members, the locking pin 30 may be engaged in the locking flanges 26 and 28 at the front and rear of the demountable cargo box to thereby securely detachably lock the latter to the vehicle chassis.

The base 16 of the demountable cargo box is provided with front and rear support means by which front and rear support legs 38 and 40 respectively are movably connected to the base.

Referring first to Figures 2, 3 and 7 particularly, it will be observed that the front support means designated generally by the numeral 42 comprises a generally hollow member 44 which is secured upon and extends transversely of the side frame members 22 of the base. Slidably received in the opposite open ends of this hollow member 44 are a pair of movable sections each designated by the numeral 46 and which as shown in Figure 7 may conveniently comprise an eye beam or the like. It will thus be seen that the sections 46 and the member 44 are telescopically engaged so that the sections may be moved inwardly and outwardly of this member. The end portions of the sections which project outwardly beyond the ends of the hollow member 44 have rigidly secured therebeneath plates 48 to which the upper ends of the legs 38 are rigidly secured.

The legs 38 are of any conventional design but are vertically extensible and retractible, being telescoping in nature, and being provided with foot plates 50 at their lower ends. Any suitable actuating means is provided inside the legs 38 for telescopingly extending or contracting these legs as desired, there being preferably provided a common actuating means for simultaneously telescopingly adjusting the pair of front legs 38. For this purpose there is provided a central rod 52 suitably journaled and extending between the side frame members 22 of the base, and having a universal joint 54 at each end thereof. The universal joint is coupled by a rod section 56 to a second universal joint 58 which in turn is connected to a shaft 60 forming a part of the actuating mechanism in each of the extensible front legs 38. At one end, one of the shafts 60 is provided with a crank 62 whereby the mechanism may be manually operated to telescopingly extend or retract the front legs 38 as desired.

At this point it should be noted that the central rod 52, as shown in dotted lines in Figure 3 is preferably telescoping in nature in order that upon lateral outward movement or inward movement of the front legs 38 relative to each other by sliding of the sections 46 in the member 44 the actuating means for these legs may likewise be laterally expanded or contracted simultaneously therewith to maintain at all times an operative connection between the handle 62 and the actuating mechanism within each leg.

Reference is next made more particularly to Figures 1, 2, 6 and 8 for an explanation of the rear leg assembly, its support means and its actuating means.

Each of the rear leg assemblies 40 is pivotally connected to the base for swinging movement in vertical planes which are parallel to the sides of the base. Thus, a support bracket 64 is rigidly secured to and extends laterally from the top of each rear leg, and is pivotally connected as at 66, see in particular Figure 1, between a pair of parallel mounting plates 68 which form a part of the base 16. Registering apertures 70 and 72 provided respectively in the bracket 64 and in the mounting plate 68 are adapted to receive a locking pin 74, which may be secured as by a chain 76 to the base, see Figure 8, whereby when the leg assemblies 40 are swung downwardly into their vertical load bearing position, they may be rigidly locked to the base.

The rear legs 40 are telescoping for extension or retraction in the same manner as the front legs 38, and a common actuating rod 80 extends between the same to connect their actuating mechanism together, a manual handle 82 being provided for manually operating the actuating mechanisms of the rear legs in unison. By this means the legs may be telescopingly extended or retracted as desired.

Each rear leg assembly 40 is provided with a hinged brace which serves to raise the leg to its retracted position or to lower the same into its extended vertical load bearing position. This hinged brace comprises an upper arm 84 together with a lower arm 86, these two arms being pivotally connected together by a pivot pin 88.

As will be best apparent from Figure 8, the upper and lower arms 84 and 86 are each composed of a pair of plates rigidly secured together. The upper arm 84 is rigidly connected to a shaft 90, see Figure 2, which is journaled in supporting brackets 92 carried by the base 16 and extends transversely of the latter. One end of this shaft is squared to receive a handle whereby a rocking movement may be imparted to this shaft.

Consequently, when a rocking movement is imparted to the shaft 90, the upper arms 84 will be given a swinging or oscillatory movement in vertical planes which are parallel to the sides of the base. The lower ends of the lower arms 86 in turn are pivoted as by a pivot pin 96 to the rear leg assemblies 40. The locking pin 98, which may be secured as by a chain 100 to the leg 40 or to the brace link is removably secured in aligned apertures in the upper and lower arms in order to lock the latter in their aligned position shown in Figures 1 and 6.

For this purpose one of the transverse stringers 24 is provided at one end with a projecting bracket 102 to which is secured as by a pivot pin 104 a C-shaped yoke 106. The latter has its open end disposed toward the hinged brace for receiving the locking pin 98 therein whereby the yoke may assist as shown in Figure 6 to retain the pivoted end of the upper arm 84 in raised position. The latch is retained in closed position by means of a latch release arm 108 having a hooked extremity 110 which is engaged in the opening of the C-shaped yoke as shown in Figure 6 to thereby retain the latter in a position supporting and retaining the locking pin 98. The latch release arm 108 is carried by a shaft 112 journaled in a lug 114 carried by the stringer 24 and provided with a handle 116. Upon rocking movement imparted to the shaft 112 by the handle 116, the latch release means may have its hooked extremity 110 withdrawn from the yoke 106 whereby the latter can be pivoted downwardly to release the pin 98 and thus permit the hinged brace to swing downwardly and thereby permit the associated rear leg assembly 40 to likewise move downwardly to a vertical position under its own weight.

As so far described it will thus be obvious that when not in use, the rear leg assembly may be swung upwardly and retained in its raised position shown in Figure 1 by engagement of the hinged end of the brace arms with the latching means. When it is desired to use the legs, the latch release means 108 is released, the hinged brace opens downwardly and the rear legs move into their vertical position. Thereafter the actuating means may be operated by the handle 82 to extend the legs to the desired position to thereby lift the weight of the rear end of the cargo box and its base off of the truck chassis, the locking means 30 being first withdrawn. In a similar manner the front leg assembly is operated to move the front legs laterally outwardly from the truck to thereby clear the rear axle assembly of the latter, and the legs actuated to extend the same to lift the front portion of the cargo box and its base off of the truck chassis. Thereafter the truck may be driven beneath the cargo box and the latter may be left for loading or unloading as desired.

In the reverse operation by which a truck picks up a loaded cargo box, it will be understood that the engagement of the cooperating guide means 34 and 36 facilitate the proper positioning of the truck chassis beneath the base of a cargo box to facilitate the lowering of the latter upon the truck chassis by manipulating the actuating means of the front and rear leg assemblies. Thereafter the lock means 30 is applied, the front leg assembly is moved inwardly to its stored position against the side of the cargo box, and the rear leg assembly having been retracted is then raised after disengaging the locking pin 98, and the latching means is then applied to retain the rear legs in their raised position.

*Embodiment of Figures 9–15*

In the embodiment of Figures 9–15 the same base 16 having the side frame members 22 together with transverse stringers 24 is provided as in the preceding embodiment, it being further understood that the same rear support means and rear leg assembly as previously described are provided. However, the front leg assembly is modified so that instead of being mounted for rectilinear sliding movement transversely of the base, they are mounted for horizontal swinging movement about vertical pivots carried by the base, being thus moved from a collapsed position against the side of the base into a laterally extended position which will permit clearance of the rear wheels of the tractor. Further, there are provided a pair of guide members 120 carried by and extending forwardly from the inside surface of the side frame members 22, and cooperating with complemental guiding members on the truck chassis in the same manner as set forth in connection with the preceding embodiment.

Referring now particularly to Figures 9, 11, 12 and 15 it will be seen that the opposite ends of the two forward stringers 24 of the base are provided with upper and lower flat plates 122 and 124 respectively and a carriage 126 in the form of an inverted channel member with depending side flanges 128 is pivoted to the underside of the plate 124 by a vertical pin 130 whereby the carriage may be swung in a horizontal plane about the vertical axis of this pin.

The upper end of each front leg assembly 38 is rigidly secured to the underside of the carriage 126 between the flanges 128 thereof at a position remote from the vertical axis of the pin 130.

A support track is provided to assist in supporting the weight of the carriage 126 and the leg assembly 38 carried thereby. This track, as shown best in Figure 13, consists of a curved member 132 having one end rigidly secured as by welding to the side frame member 22 and having its other end secured to a depending support bracket 134 secured to the plates 122 and 124 previously mentioned. The track 132 thus underlies the lower edge of the flanges 128 of the carriage in spaced relation thereto. Additional brace rods 136, see Figure 14, adjustably carried by brackets 138 mounted upon a part of the base framework may be provided to further rigidify the support of the track.

The lower edges of the flanges 128 of the carriage 126 are provided with a slide block 140, see Figure 11, which slidably rests upon the top of the track 132 to thus support the carriage during the horizontal swinging movement of the latter.

Figures 9 and 15 show the position of the carriage and of the front leg assembly 38 supported thereby in the laterally extended position of the legs for supporting the cargo box, while Figure 15 shows the position of the carriage and the leg assembly when they are collapsed against the base of the device.

Referring now especially to Figures 10–12, there is seen the actuating means for simultaneous operation of the telescopingly extensible and retractible front leg assemblies 38. This actuating means includes a central rod 150 which extends transversely through and is journaled in the pair of side frame members 22, being provided at its outer ends with universal joints 152 which are in vertical alignment with the pivot pins 130. Each universal joint in turn is connected to a shaft 154 which extends into the leg assembly 38 for operating the actuating means thereof, not shown. However, a control shaft 156 connected with this actuating mechanism extends through the exterior of one of the leg assemblies, and is provided with a handle 158 whereby manual actuation may be applied by means of the coupling members 150, 152 and 154 to both of the front leg assemblies for simultaneous operation thereof.

It will thus be seen that in this embodiment the same construction of telescoping adjustable vertically swingable and foldable rear leg assembly is provided as in the preceding embodiment, while a modified construction of front leg assembly is provided which while being vertically telescoping adjustable is also horizontally swingable about a vertical pivot.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A demountable cargo box for vehicles comprising a base, a box mounted upon said base, fastening means for detachably securing said base upon the chassis of a vehicle, front and rear legs on said base for supporting the latter when the cargo box is removed from a vehicle chassis, each of said legs extending beneath said base and being vertically extensible and retractible, front and rear support means for movably connecting said front and rear legs respectively to said base, said front support means comprising a carriage for each front leg, pivot means connecting each carriage to said base for horizontal swinging movement of said carriage about a vertical axis, said rear support means including a pivotal mounting for each rear leg connecting the latter to said base for swinging movement in a plane perpendicular to the plane of said base.

2. The combination of claim 1 including locking means engaging said pivotal mountings and said base for locking said rear legs in a vertical, load supporting position.

3. The combination of claim 1 including a hinged brace connected to each rear leg and to said base, means retaining said brace in its leg lowering position.

4. The combination of claim 3 including latch means on said base retaining said brace in its leg raised position.

5. The combination of claim 4 including a common actuating means connected to said rear legs for simultaneously extending and retracting the latter.

6. The combination of claim 1 including common actuating means connected to the legs of each carriage for simultaneously extending or retracting said legs.

7. The combination of claim 1 including a track mounted on said base adjacent each carriage, means slidably mounting said carriage upon its adjacent track for supporting the carriage during horizontal swinging of the latter.

8. The combination of claim 1 including forwardly and outwardly curving laterally spaced guide members on said base engageable with complementary means on a vehicle chassis for centering and positioning said base upon said chassis.

9. A demountable cargo box for vehicles comprising a base, a box supported upon said base, fastening means for detachably securing said base upon the chassis of a vehicle, front and rear legs on said base for supporting the latter when the cargo box is removed from a vehicle chassis, each of said legs extending beneath said base and being vertically extensible and retractible, front and rear support means for movably connecting said front and rear legs respectively to said base, said front support means comprising a carriage for each front leg, pivot means connecting each carriage to said base for horizontal swinging movement of said carriage about a vertical axis, an arcuate track mounted on said base adjacent each carriage, means slidably mounting said carriage upon its adjacent track for supporting the carriage during horizontal swinging of the latter.

References Cited in the file of this patent

UNITED STATES PATENTS

| 1,303,854 | Clark | May 20, 1919 |
| 2,172,244 | Grundler | Sept. 5, 1939 |
| 2,375,264 | Wagner et al. | May 8, 1945 |
| 2,656,942 | Helms | Oct. 27, 1953 |
| 2,751,234 | Couse | June 19, 1956 |
| 2,847,137 | Stringfellow | Aug. 12, 1958 |